(12) United States Patent
Lindqvist et al.

(10) Patent No.: US 11,820,264 B2
(45) Date of Patent: Nov. 21, 2023

(54) VEHICLE SEAT WITH AN UPHOLSTERED SECTION AND AT LEAST ONE COVER FOR CAPPING A THROUGH OPENING IN THE UPHOLSTERED SECTION, AND METHOD FOR FITTING A COVER ON A SEAT SECTION OF A VEHICLE SEAT

(71) Applicant: ADIENT ENGINEERING AND IP GMBH, Burscheid (DE)

(72) Inventors: Johan Lindqvist, Goeteborg (SE); Rahul Masane, Goeteborg (SE); Lennart Svensson, Cologne (DE)

(73) Assignee: Adient US LLC, Plymouth, MI (US)

( * ) Notice: Subject to any disclaimer, the term of this patent is extended or adjusted under 35 U.S.C. 154(b) by 107 days.

(21) Appl. No.: 17/419,393

(22) PCT Filed: Feb. 13, 2020

(86) PCT No.: PCT/EP2020/053762
§ 371 (c)(1),
(2) Date: Jun. 29, 2021

(87) PCT Pub. No.: WO2020/169447
PCT Pub. Date: Aug. 27, 2020

(65) Prior Publication Data
US 2022/0063457 A1 Mar. 3, 2022

(30) Foreign Application Priority Data

Feb. 20, 2019 (DE) ...................... 10 2019 104 288.7
Feb. 28, 2019 (DE) ...................... 10 2019 105 150.9
Jun. 4, 2019 (DE) ...................... 10 2019 114 909.6

(51) Int. Cl.
*B60N 2/28* (2006.01)
*B60N 2/58* (2006.01)
*B60N 2/60* (2006.01)

(52) U.S. Cl.
CPC ......... *B60N 2/2893* (2013.01); *B60N 2/5841* (2013.01); *B60N 2/60* (2013.01)

(58) Field of Classification Search
CPC ....... B60N 2/2893; B60N 2/5841; B60N 2/60
See application file for complete search history.

(56) References Cited

U.S. PATENT DOCUMENTS 7,789,462 B2 9/2010 Glover et al.
9,340,128 B2 * 5/2016 Arai ..................... B60N 2/6009
(Continued)

FOREIGN PATENT DOCUMENTS

CN 104442467 A 3/2015
CN 104802673 A 7/2015
(Continued)

OTHER PUBLICATIONS

PCT International Search Report and Written Opinion (PCT/EP2020/053762).
(Continued)

*Primary Examiner* — Anthony D Barfield
(74) *Attorney, Agent, or Firm* — Marshall & Melhorn, LLC (57) ABSTRACT

A vehicle seat may have an upholstered section and at least one cover for capping a through opening in the upholstered section. The cover may have a support, a trim and a cap. A method for fitting the cover may have at least the following steps: fitting the trim and the cap to form a preassembled subassembly, fitting the support on a seat frame of the vehicle seat, positioning an upholstered section on the seat frame, and inserting the subassembly through a through opening in the upholstered section into the support. An edge region of a covering of the upholstered section is clamped between the trim and the support. The subassembly may be fitted to the support.

14 Claims, 9 Drawing Sheets

(56) References Cited

U.S. PATENT DOCUMENTS

| | | |
|---|---|---|
| 9,649,964 B2 | 5/2017 | Imajo |
| 9,656,577 B2 * | 5/2017 | Sekino ................ B60N 2/6009 |
| 2016/0107553 A1 | 4/2016 | Imajo |
| 2016/0200224 A1 | 7/2016 | Fujikake et al. |
| 2016/0250948 A1 | 9/2016 | Sekino et al. |
| 2016/0325658 A1 | 11/2016 | Hodgson |
| 2018/0056821 A1 | 3/2018 | Konrad |
| 2018/0257520 A1 | 9/2018 | Shirai et al. |
| 2018/0361890 A1 | 12/2018 | Ishizaka et al. |

FOREIGN PATENT DOCUMENTS

| | | |
|---|---|---|
| CN | 105307898 A | 2/2016 |
| CN | 107487238 A | 12/2017 |
| CN | 108177567 A | 6/2018 |
| CN | 108189719 A | 6/2018 |
| DE | 19853149 | 3/2000 |
| DE | 102006058388 B4 | 6/2008 |
| DE | 10004598 | 8/2008 |
| DE | 102008009575 | 8/2009 |
| EP | 1352779 B1 | 11/2008 |
| EP | 3000654 A1 | 3/2016 |

OTHER PUBLICATIONS

German Patent and Trademark Office, Office Action in Application No. DE10 2019 114 909.6, dated Jan. 28, 2021, 5 pages.
China National Intellectual Property Administration, Office Action in Application No. CN202080015674.2, dated Nov. 9, 2022, 16 pages.

* cited by examiner

VEHICLE SEAT WITH AN UPHOLSTERED SECTION AND AT LEAST ONE COVER FOR CAPPING A THROUGH OPENING IN THE UPHOLSTERED SECTION, AND METHOD FOR FITTING A COVER ON A SEAT SECTION OF A VEHICLE SEAT

FIELD

The invention relates to a vehicle seat with a cushion part and at least one covering for lining a through opening in the cushion part, the covering having a carrier, a bezel and a cover. In addition, the invention relates to a method for mounting a covering on a seat part of a vehicle seat.

BACKGROUND

Fastening apparatuses for fastening a child seat to a vehicle seat are known from the prior art. In the case of what is known as an ISOFIX fastening apparatus, two fastening elements which are connected at least indirectly to the vehicle seat interact with two locking apparatuses (what are known as connectors) of the child seat. For this purpose, the fastening apparatus has the two fastening elements which are at the same spacing from one another as the connectors of the child seat. Each fastening element is preferably configured as a bracket in accordance with the ISOFIX standard, and preferably consists of a wire which is bent multiple times and has a circular cross section of approximately constant diameter.

DE 100 04 598 A1 discloses a fastening apparatus for fastening a child seat to a vehicle seat, in the case of which fastening apparatus a fastening element is configured as a bent wire which has two ends which are fastened to a crossmember of a seat substructure. The crossmember is a tube.

DE 10 2008 009 575 A1 has disclosed a fastening apparatus for fastening a child seat to a vehicle seat, comprising a carrier and a bracket, the bracket having at least one first fastening section, one second fastening section and one web, and the first and the second fastening section being separate from one another and being connected in each case fixedly to the carrier. The web connects the first and the second fastening section to one another, the bracket being in one piece. The bracket is a shaped, flat metal sheet. The web has a C-shaped cross section. The fastening apparatus serves to hook a fastening hook, which is attached to one end of a belt, the other end of which is fastened to an upper region of a child seat, on the rear side of a vehicle backrest, and in this way to secure the child seat. The belt with the hook is also called a top tether. Top tethers of this type are used, in particular, in the USA and Canada for fastening child seats to the vehicle structure.

DE 198 53 149 C1 discloses a vehicle seat, to which a child seat can be attached by a fastening apparatus which is arranged on the vehicle seat between a seat cushion and a backrest. The fastening apparatus can be concealed in the case of non-use by a covering. That side of the covering which faces away from the fastening apparatus forms a part of the seat face of the vehicle seat.

US 2016/0200224 A1, US 2016/0250948 A1, US 2016/0325658 A1, CN 108177567 A and CN 108189719 A have also disclosed coverings for fastening apparatuses for fastening a child seat to a vehicle seat.

EP 1 352 779 A1 has disclosed a control lever assembly for use in a vehicle seat which is covered with a textile coating. The control lever assembly has a device for changing the mechanical state of a system for controlling the position of the vehicle seat, and a flange for surrounding the device for changing the mechanical state.

DE 10 2006 058 388 A1 discloses a method for mounting an actuating apparatus for a vehicle, having a base part, a bezel, a handle piece and at least one Bowden cable with an end fitting, the base part having a first collar and the bezel having a second collar, a clamping gap being produced during mounting between the first collar and the second collar, and an upholstery part being clamped in the clamping gap. The upholstery part is pulled over the base part, the upholstery part having a recess which lies above the chamber of the base part, and the flap of the upholstery part being guided around the inner periphery of the first collar and being pushed by the slot onto a lug, as a result of which a positively locking connection is produced.

US 2018/0361890 A1 discloses a vehicle seat with a covering for lining a through opening in a cushion part of the vehicle seat, a fastening element for fastening a child seat being arranged in the through opening, and the covering having a carrier, a bezel and a cover. The carrier and the bezel are fastened to a foam part of the vehicle seat.

US 2018/0257520 A1 discloses a vehicle seat with a covering for partial lining of a depression in a cushion part of the vehicle seat, an unlocking lever for unlocking a backrest locking means being arranged in the depression, and the covering having a carrier and a bezel.

SUMMARY

The invention is based on the problem of improving a vehicle seat with a cushion part and at least one covering for lining a through opening in the cushion part, in particular of providing the possibility for covering an edge region of an upholstery part of a cushion part in the region of the through opening in a high quality manner, and for fastening it in a largely stationary manner with respect to the seat frame. The covering is to be capable of being used, in particular, in regions of a curved cushion surface. In addition, a corresponding vehicle seat and a method for mounting a covering of this type on a seat part of a vehicle seat are to be provided.

According to the invention, said problem is solved by way of a vehicle seat with a cushion part and at least one covering for lining a through opening in the cushion part, the covering having a carrier, a bezel and a cover, the carrier being fastened to a seat frame of the vehicle seat.

By virtue of the fact that the carrier is fastened to a seat frame of the vehicle seat, a possibility is provided for covering an edge region of an upholstery part of the cushion part in the region of the through opening in a high quality manner, and for fastening it in a largely stationary manner with respect to the seat frame. In comparison with solutions which are known from the prior art and in the case of which the covering is fastened to a foam part of the vehicle seat, the upholstery part is less inclined to be yanked out of the covering.

Advantageous refinements which can be used individually or in combination with one another are the subject matter of the subclaims.

A fastening element for fastening a child seat can be arranged in the through opening, the fastening element preferably being fastened to the seat frame. A fastening element for fastening a child seat can be arranged behind the through opening, the fastening element preferably being fastened to the seat frame. A fastening element for fastening a child seat can be capable of being arranged in the through opening, the fastening element preferably being fastened to a vehicle structure. A fastening element for fastening a child seat can be capable of being arranged behind the through opening, the fastening element preferably being fastened to a vehicle structure.

The fastening element can be, in particular, a fastening point of an ISOFIX system. The fastening apparatus can have two fastening elements which are arranged in a transition region between the seat part and the backrest for fastening a child seat which can be placed on the vehicle seat. The fastening elements can be bent steel wires which are a constituent part of the load-bearing structure of the seat part.

The carrier can be of frame-shaped design. The carrier can have an approximately rectangular shape with rounded corners. The carrier can be manufactured from plastic. The carrier can be an injection molded part. The carrier can have at least one clip for fastening the carrier to the seat frame. The carrier preferably has a plurality of, in particular three, clips for fastening the carrier to the seat frame. The carrier can be clipped to a retaining plate of the seat frame. The carrier can have a curved shape. The carrier can have a shape which is curved around a transverse direction. As a result, the design of the covering can be adapted to the design of the seat part.

The bezel can be of frame-shaped design. The bezel can have an approximately rectangular shape with rounded corners. The bezel can be manufactured from plastic. The bezel can be an injection molded part. The bezel can have a peripheral edge. The peripheral edge can have an approximately rectangular shape with rounded corners. The bezel can have at least one clip for fastening the bezel to the carrier. The bezel preferably has a plurality of clips for fastening the bezel to the carrier. The bezel can be clipped to the carrier. The bezel can have a curved shape. The bezel can have a shape which is curved around a transverse direction. As a result, the design of the bezel can be adapted to the design of the seat part.

The cover can have an approximately rectangular shape with rounded corners. The cover can be manufactured from plastic. The cover can be an injection molded part. The cover can have at least one clip for fastening the cover to the bezel. The cover preferably has a plurality of clips for fastening the cover to the bezel. The cover can be clipped to the bezel. The cover can be capable of being released from the bezel. The cover can be mounted pivotably on the bezel. The cover can have a curved shape. The cover can have a shape which is curved around a transverse direction. As a result, the cover can be adapted to the design of the seat part.

In addition, the problem is solved by way of a method for mounting a covering according to the invention on a seat part of a vehicle seat. The method has at least the following method steps:
a) mounting of the bezel and the cover to form a preassembled assembly,
b) mounting of the carrier on a seat frame of the vehicle seat,
c) placing of a cushion part onto the seat frame,
d) plugging of the assembly, in particular through a through opening of the cushion part, into the carrier, as a result of which an edge region of an upholstery part of the cushion part is clamped in between the bezel and the carrier, and
e) fastening of the assembly to the carrier.

By the method, an edge region of the upholstery part can be connected fixedly to the covering. As a result, the upholstery part cannot be detached from the covering even under high loading of said upholstery part, which brings about a perceived high quality of the cushion part.

BRIEF DESCRIPTION OF THE FIGURES

In the following text, the invention is described in greater detail on the basis of one advantageous exemplary embodiment which is shown in the figures. The invention is not restricted to said exemplary embodiment, however. In the figures.

DETAILED DESCRIPTION

Figure 2:
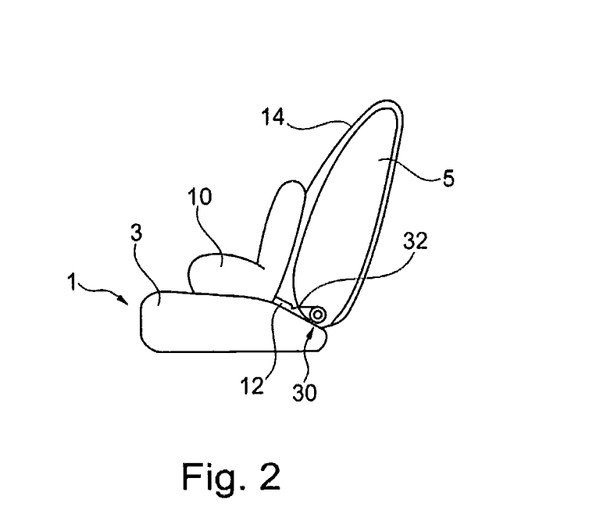
FIG. 2 shows a diagrammatic side view of a vehicle seat which is known from the prior art, with a child seat which is fastened to the vehicle seat.

FIG. 2 shows a diagrammatic illustration of an arrangement consisting of a vehicle seat 1 which is known from the prior art and a child seat 10 which is known from the prior art, configured, in particular, as an ISOFIX child seat. The vehicle seat 1 has a seat part 3 and a backrest 5.

The seat part 3 has a load-bearing structure which comprises a fastening apparatus 30 for fastening a child seat 10 to the vehicle seat 1. The fastening apparatus 30 has two fastening elements 32 which are arranged in a transition region between the seat part 3 and the backrest 5 for fastening the child seat 10 which can be placed onto the vehicle seat 1. The fastening elements 32 are preferably bent steel wires which are a constituent part of the load-bearing structure of the seat part 3.

The child seat 10 can be fastened to the two fastening elements 32. To this end, the child seat 10 has two locking apparatuses 12 (also called connectors) which project toward the rear in the lower region of the child seat 10 and can lock on the fastening elements 32.

In addition, a further fastening means can be provided on the vehicle seat 1, to which further fastening means a safety belt 14 which is known from the prior art (frequently also called a top tether in the prior art) of the child seat 10 can be fastened. The safety belt 14 is fastened in the upper region of the child seat 10, is deflected over the upper edge of the backrest 5, and is guided downward behind the backrest 5, where it can be fastened to the further fastening means of the vehicle seat 1 or the vehicle structure.

FIGS. 1 and 3 to 22 show one exemplary embodiment of a vehicle seat 50 according to the invention which is configured in the present case as a rear seat. A front seat can be of analogous construction, with the result that the invention is not restricted to a rear seat. The vehicle seat 50 has a seat part 60 and a backrest 90.

In the following text, the vehicle seat 50 will be described with the use of three spatial directions which run perpendicularly with respect to one another. In the case of a vehicle seat 50 which is installed in the vehicle, a longitudinal direction x runs largely horizontally and preferably parallel to a vehicle longitudinal direction which corresponds to the usual driving direction of the vehicle. A transverse direction y which runs perpendicularly with respect to the longitudinal direction x is likewise oriented horizontally in the vehicle and runs parallel to a vehicle transverse direction. A vertical direction z runs perpendicularly with respect to the longitudinal direction x and perpendicularly with respect to the transverse direction y. In the case of a vehicle seat 50 which is installed in the vehicle, the vertical direction z runs parallel to the vehicle vertical axis.

The positional and directional specifications which are used, such as, for example, front, rear, top and bottom, relate to a viewing direction of an occupant seated in the vehicle seat 50 in a normal seat position, the vehicle seat 50 being installed in the vehicle and being oriented in a use position which is suitable for passenger transportation with an upright backrest 90 and, as is customary, in the driving direction, without a child seat 10 being mounted. The vehicle seat 50 according to the invention can also be installed, however, in a differing orientation, for example transversely with respect to the driving direction.

Figure 5:
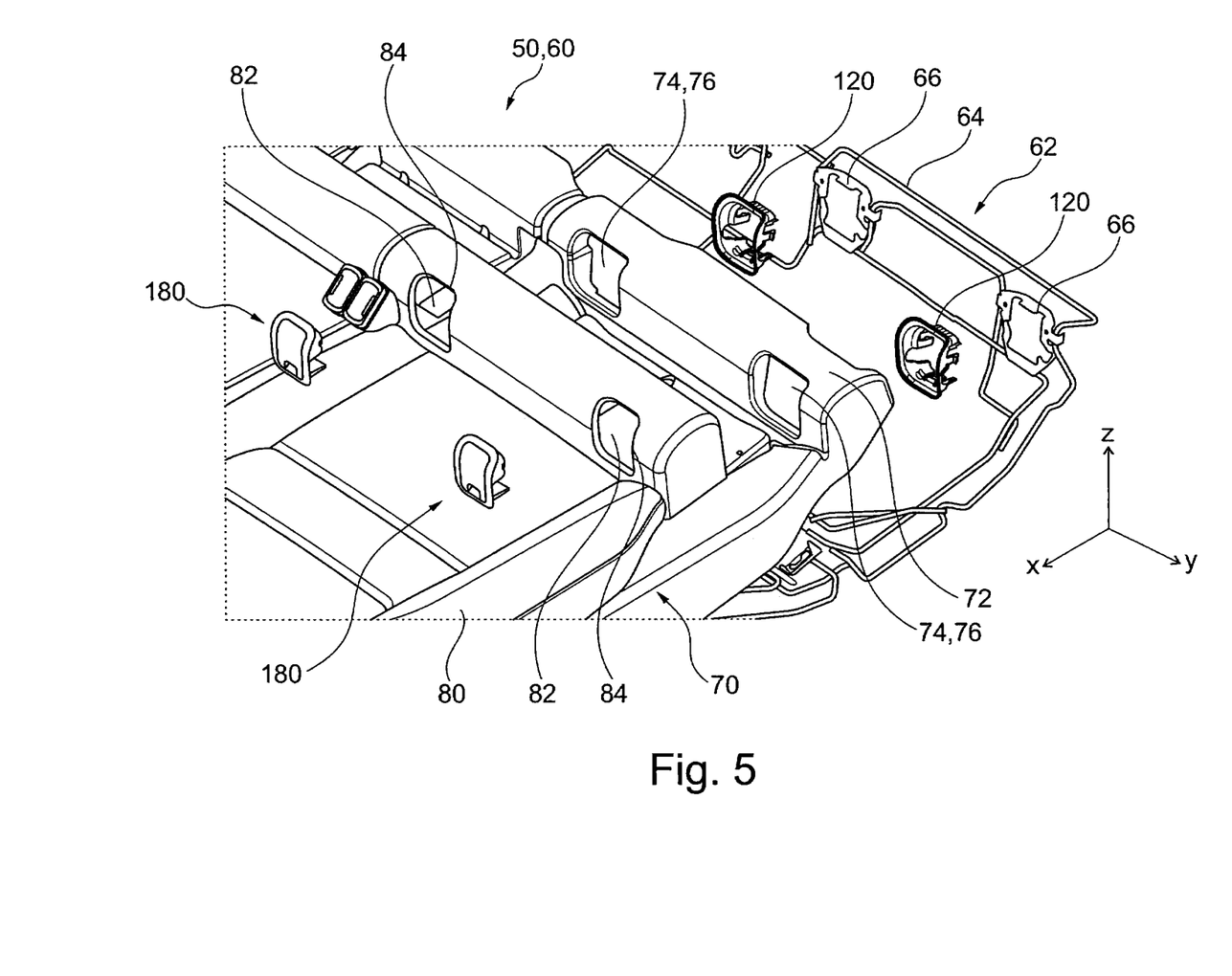
FIG. 5 shows details of an exploded illustration of a seat part of the vehicle seat from FIG. 1.

The seat part 60 has a seat frame 62 which supports a cushion part 70. The cushion part 70 comprises a foam part 72 and an upholstery part 80. The foam part 72 is upholstered with the upholstery part 80 which is manufactured, in particular, from a material or from leather. In the present case, the seat frame 62 has a wire frame 64 and two retaining plates 66 which are fastened to the wire frame 64. The wire frame 64 can be connected to a vehicle structure of the vehicle.

A fastening apparatus (not shown in FIGS. 1 and 3 to 22) for fastening a child seat 10 on the vehicle seat 50 comprises two lower fastening elements for fastening a child seat 10 which can be placed onto the vehicle seat 50. The fastening elements are preferably bent steel wires which are connected fixedly to the vehicle structure of the vehicle, into which the vehicle seat 50 can be installed. In one modification of the exemplary embodiment, the fastening elements are a constituent part of the seat frame. The fastening of the child seat 10 to the vehicle seat 50 by the fastening elements takes place as described above with reference to FIG. 2 and the prior art.

The fastening elements of the fastening apparatus are arranged behind a bolster 78 of the cushion part 70, which bolster 78 adjoins the backrest 90. The cushion part 70 has two through openings 74 per seating position. The through openings 74 are formed by way of corresponding through holes 76 in the foam part 72, and corresponding upholstery part openings 82 in the upholstery part 80. The through openings 74 allow what are known as connectors of the child seat 10 to be guided through the cushion part 70 and to be locked to the fastening elements. The fastening elements can be arranged behind the associated through opening 74 or in the associated through opening 74.

Figure 1:
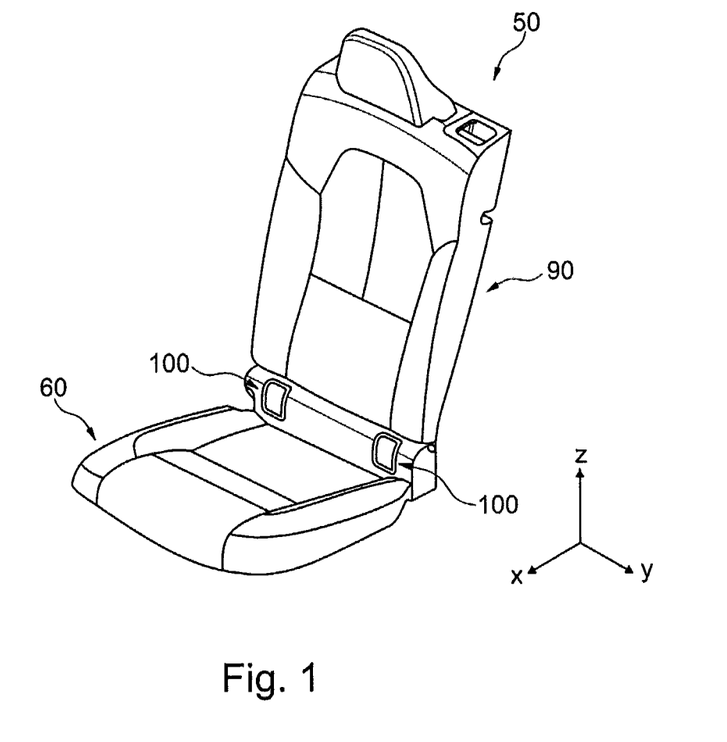
FIG. 1 shows a perspective view of a vehicle seat according to the invention with two coverings for a fastening apparatus for fastening a child seat to the vehicle seat.

The through openings 74 are concealed in each case by way of a covering 100. In addition, in each case one covering 100 serves to line in each case one through opening 74 in the cushion part 70, a fastening element for fastening a child seat 10 being arranged, in particular, in the through opening 74 or behind the through opening 74.

Figure 3:
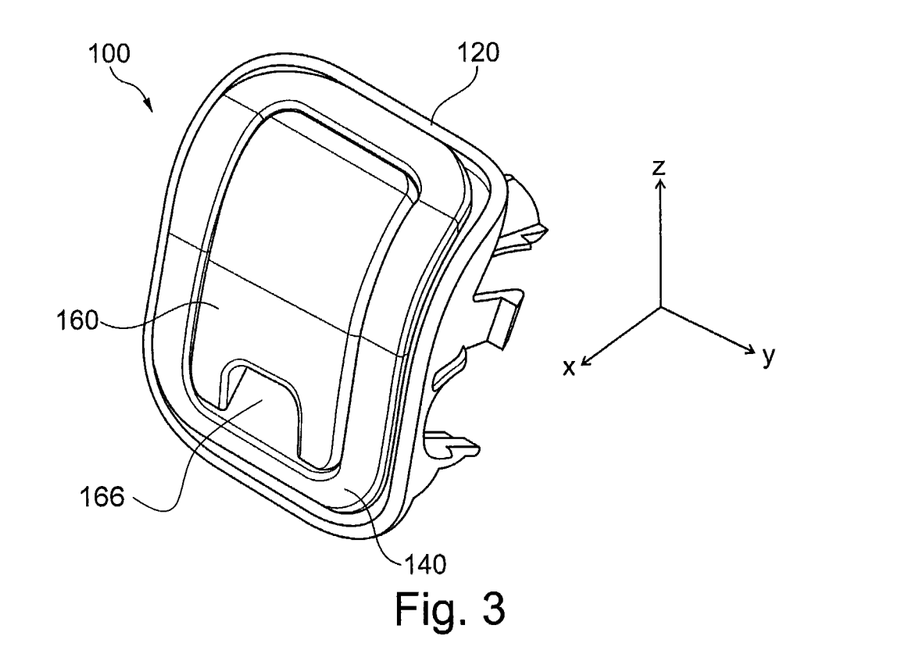
FIG. 3 shows a perspective view of one of the two coverings from FIG. 1.
Figure 4:
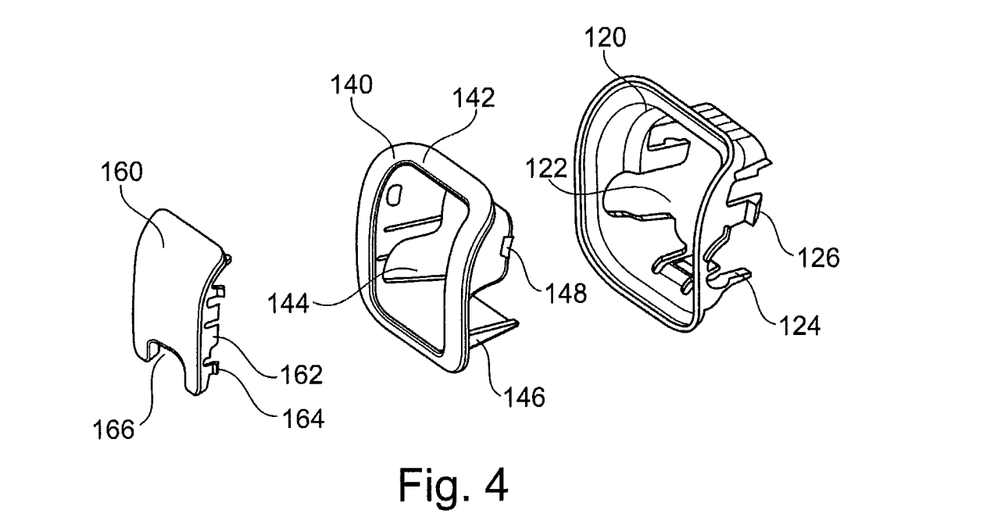
FIG. 4 shows an exploded illustration of the covering from FIG. 3.

Each of the two coverings 100 has a carrier 120, a bezel 140 and a cover 160.

Figure 6:
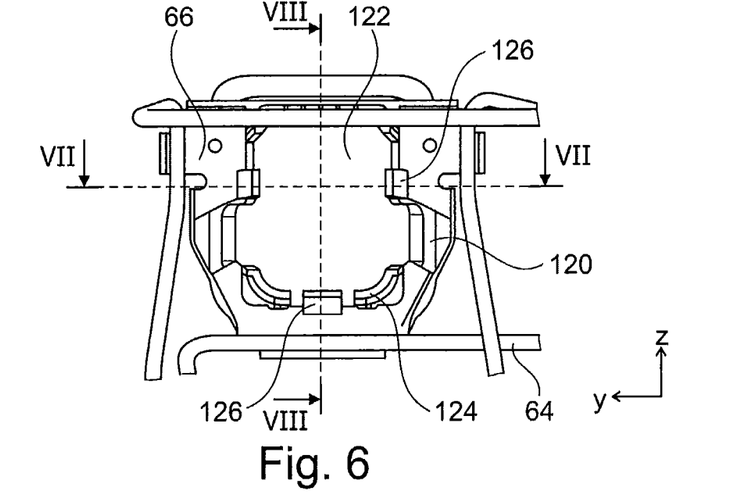
FIG. 6 shows a rear view of a carrier of the covering, which carrier is mounted on a seat frame.
Figure 7:
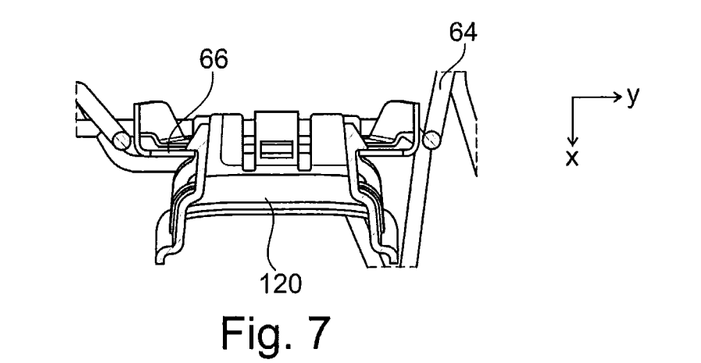
FIG. 7 shows a section along the line VII-VII in FIG. 6.
Figure 8:
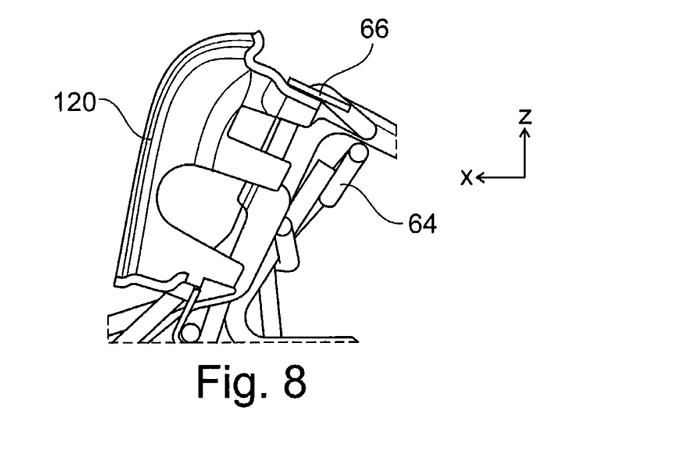
FIG. 8 shows a section along the line VIII-VIII in FIG. 6.
Figure 9:
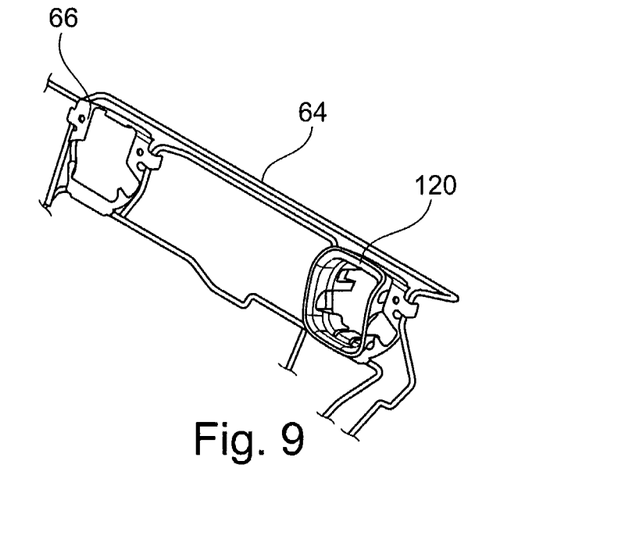
FIG. 9 shows details of a perspective view of the seat frame and a carrier which is mounted on the seat frame.
Figure 10:
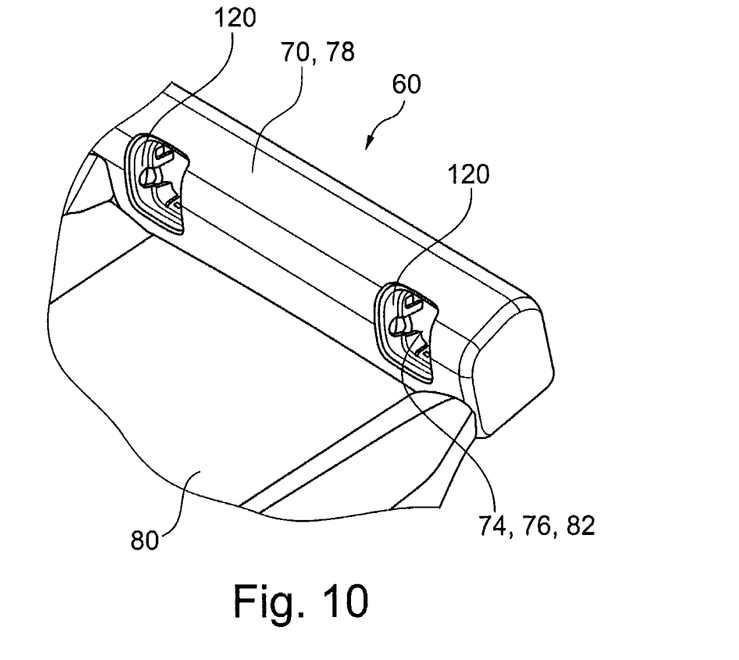
FIG. 10 shows details of a perspective view of the seat part before mounting of in each case one bezel and in each case one cover to the carriers of the coverings, which carriers have already been mounted.

The carrier 120 is of frame-shaped design. The carrier 120 is preferably manufactured from plastic. The carrier 120 has an opening 122. The carrier 120 has a plurality of centering means 124 for centering the carrier 120 on the seat frame 62, in the present case in an opening of that retaining plate 66 of the seat frame 62 which is assigned to the carrier 120. In addition, the carrier 120 has a plurality of clips 126 for fastening the carrier 120 to the seat frame 62, in the present case to the retaining plate 66 of the seat frame 62. The carrier 120 has a curved contour which is adapted to the contour of the cushion part 70, in particular of the bolster 78.

Figure 11:
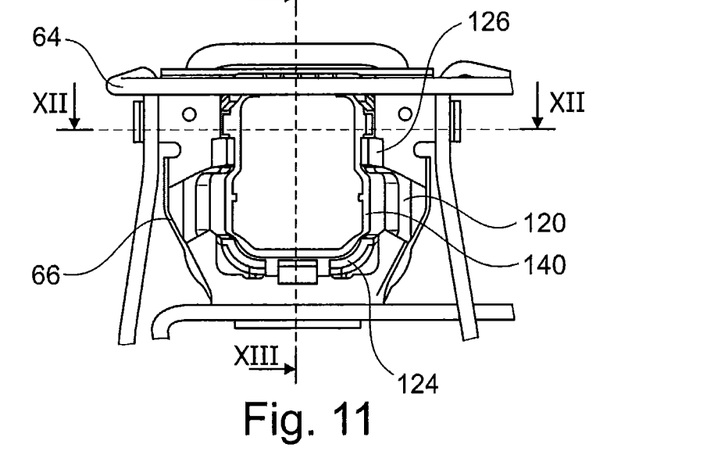
FIG. 11 shows a rear view of a carrier which is mounted on the seat frame, and of a bezel which is mounted on the carrier.
Figure 12:
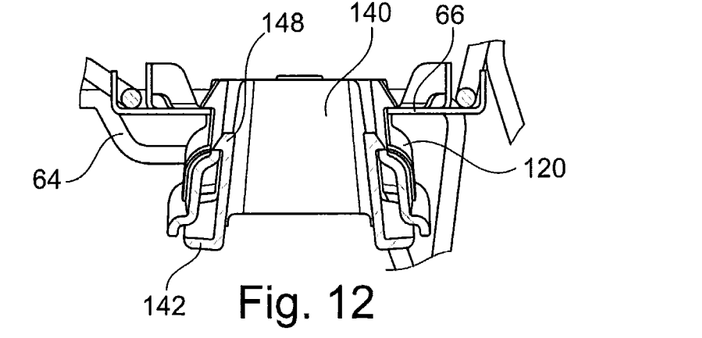
FIG. 12 shows a section along the line XII-XII in FIG. 11.
Figure 13:
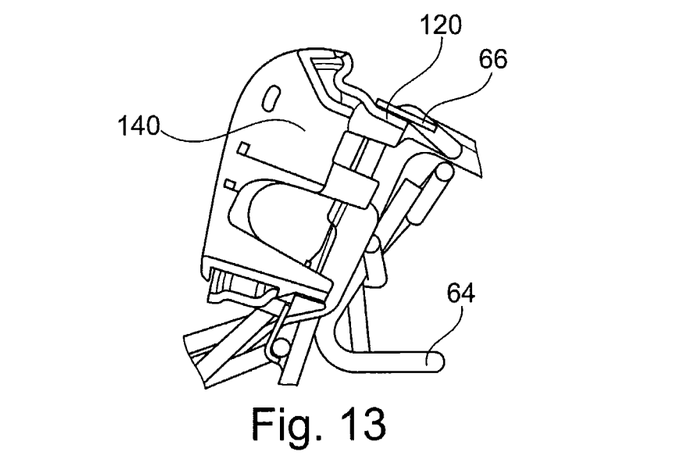
FIG. 13 shows a section along the line XIII-XIII in FIG. 11.
Figure 17:
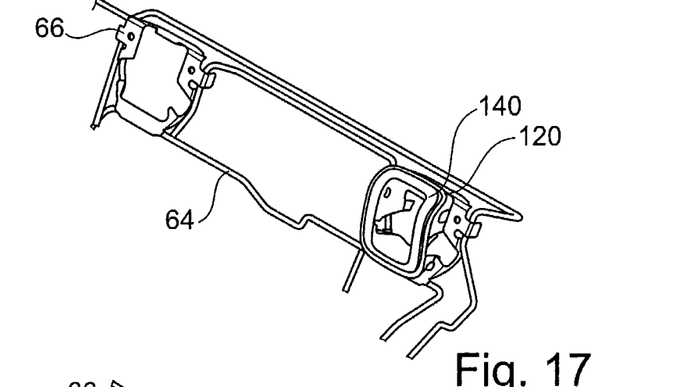
FIG. 17 shows details of a perspective view of the seat frame, of a carrier which is mounted on the seat frame, and of a bezel which is mounted on the carrier.

The bezel 140 is of frame-shaped design. The bezel 140 has a peripheral edge 142 which surrounds an opening 144 of the bezel 140. The bezel 140 is preferably manufactured from plastic. The bezel 140 has a plurality of centering means 146 for centering the bezel 140 on the carrier 120, in the present case in the opening 122 of the carrier 120. In addition, the bezel 140 has a plurality of clips 148 for fastening the bezel 140 to the carrier 120. The bezel 140, in particular the edge 142 of the bezel 140, has a curved contour which is adapted to the contour of the cushion part 70, in particular of the bolster 78.

Figure 14:
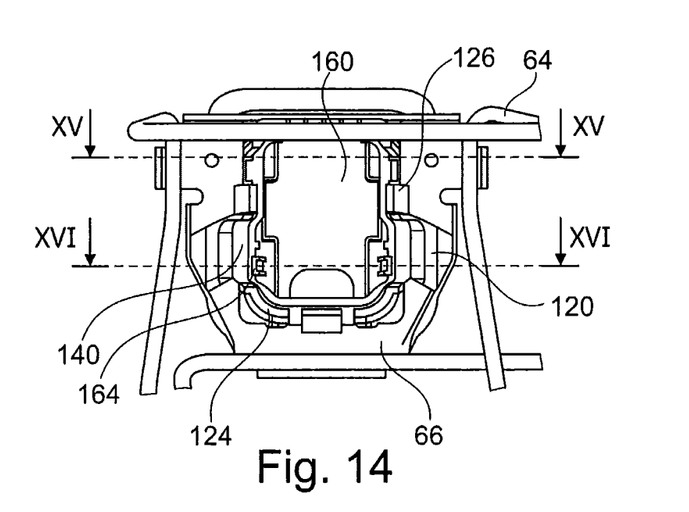
FIG. 14 shows a rear view of a carrier which is mounted on a seat frame, of a bezel which is mounted on the carrier, and of a cover which is pushed into the bezel.
Figure 15:
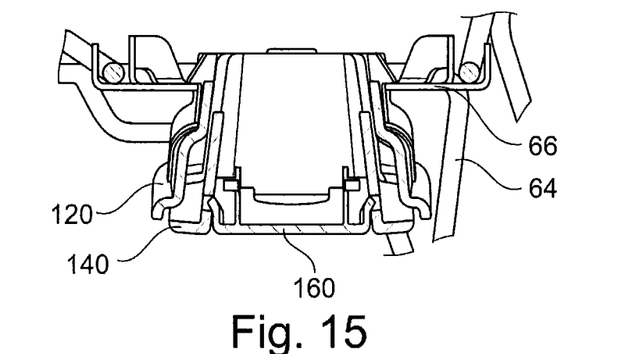
FIG. 15 shows a section along the line XV-XV in FIG. 14.
Figure 16:
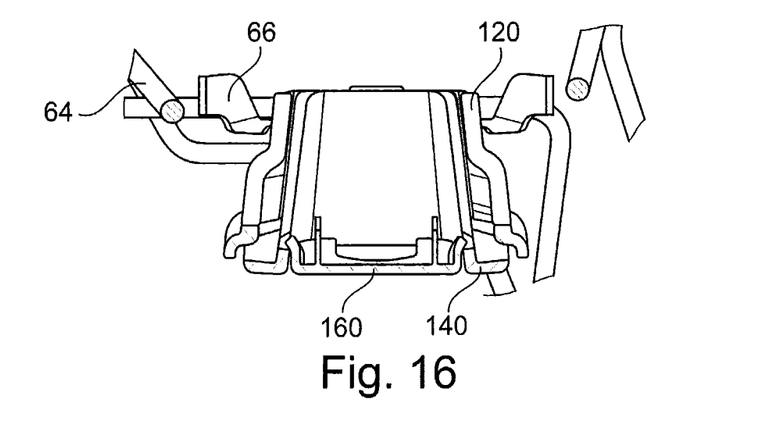
FIG. 16 shows a section along the line XVI-XVI in FIG. 14.
Figure 18:
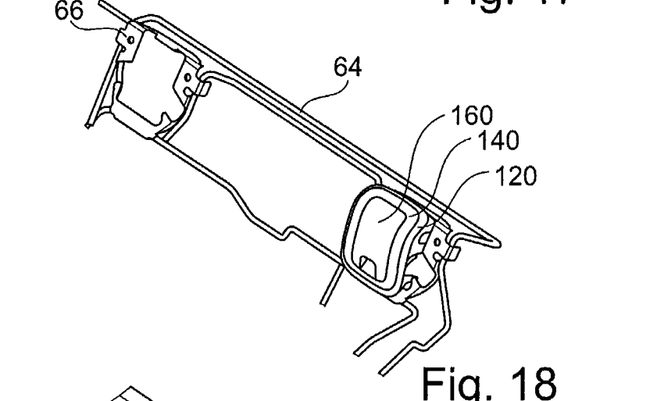
FIG. 18 shows details of a perspective view of the seat frame, of a carrier which is mounted on the seat frame, of a bezel which is mounted on the carrier, and of a cover which is pushed into the bezel.

The cover 160 is preferably manufactured from plastic. The cover 160 has a plurality of centering means 162 for centering the cover 160 on the bezel 140, in the present case in the opening 144 of the bezel 140. In addition, the cover 160 has a plurality of clips 164 for fastening the cover 160 to the bezel 140. In the present case, the cover 160 can be released from the bezel 140. In order to release the cover 160 from the bezel 140, the cover 160 has a grip recess or grip opening 166. For example, an index finger can be plugged into said grip opening 166, in order to pull the cover out of the bezel 140. In one modification of the exemplary embodiment, the cover is mounted pivotably on the bezel.

Figure 19:
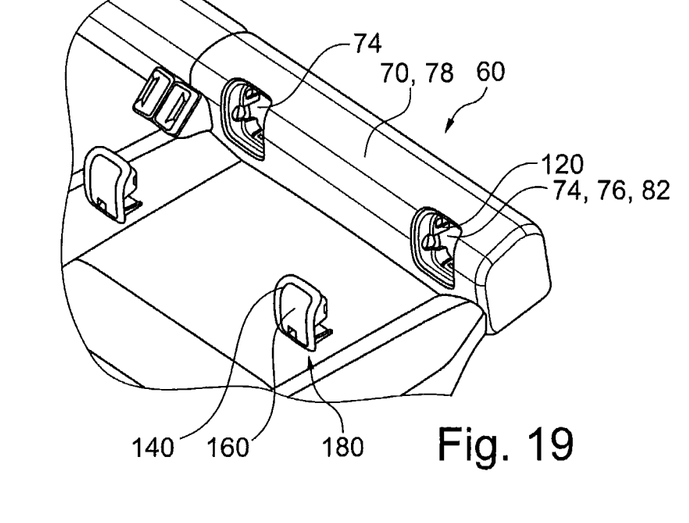
FIG. 19 shows details of an illustration of the seat part immediately before mounting of in each case one assembly consisting of a bezel and a cover on the carriers of the covering, which carriers have already been mounted.
Figure 20:
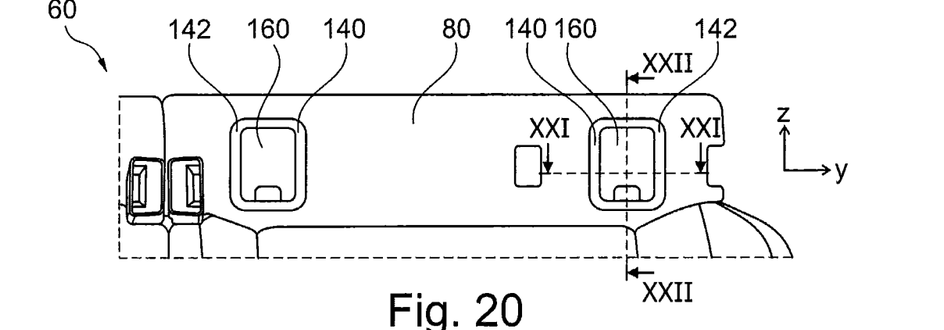
FIG. 20 shows details of a view from the front of the completely upholstered and mounted seat part.

A method according to the invention for mounting the cover 100 on the seat part 60 of the vehicle seat 50 provides the following method steps, the sequence of the list of method steps being variable in so far as this is possible appropriately:
- a) mounting of the bezel 140 and the cover 160 to form a preassembled assembly 180,
- b) mounting of the carrier 120 on the seat frame 62 of the vehicle seat 50,
- c) placing of the cushion part 70 onto the seat frame 62,
- d) plugging of the assembly 180, in particular through a through opening 74 of the cushion part 70, into the carrier 120, as a result of which an edge region 84 of an upholstery part 80 of the cushion part 70 is clamped in between the bezel 140 and the carrier 120,
- e) fastening of the assembly 180 to the carrier 120.

The mounting of the bezel 140 and the cover 160 to form a preassembled assembly 180 preferably takes place temporally before the mounting of the carrier 120 on the seat frame 62. In one modification of the method, the mounting of the carrier 120 on the seat frame 62 of the vehicle seat 50 takes place temporally before the mounting of the bezel 140 and the cover 160 to form a preassembled assembly 180.

Figure 21:
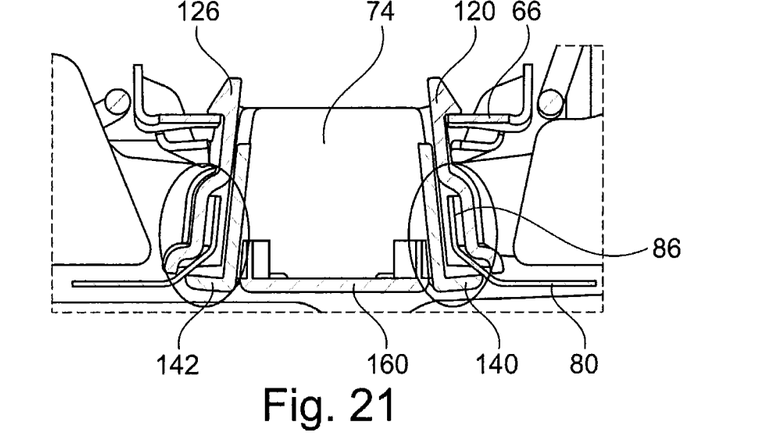
FIG. 21 shows a section along the line XXI-XXI in FIG. 20.
Figure 22:
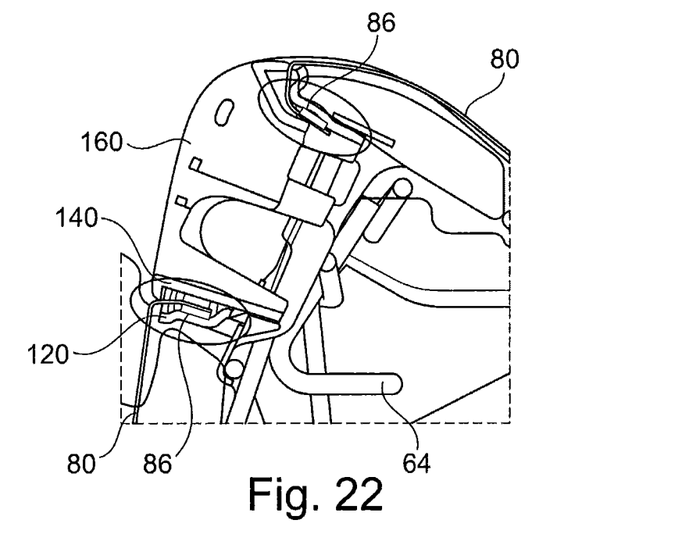
FIG. 22 shows a section along the line XXII-XXII in FIG. 20.

An edge region 84 of the upholstery part 80, which edge region 84 surrounds the upholstery part opening 82, is clamped in between the bezel 140, in the present case the edge 142 of the bezel 140, and the carrier 120. In the present case, a fastening bar 86 is fastened, preferably sewn, in the edge region 84 of the upholstery part 80. The fastening bar 86 is arranged between the carrier 120 and the edge 142 and, in addition, secures the edge region 84 of the upholstery part 80 in a positively locking manner in a gap between the carrier 120 and the bezel 140.

The features which are disclosed in the above description, the claims and the figures can be of significance both individually and in combination for the implementation of the invention in its various refinements, in so far as they remain within the scope of protection of the claims.

LIST OF DESIGNATIONS

1 Vehicle seat
3 Seat part
5 Backrest
10 Child seat
12 Locking apparatus
14 Safety belt
30 Fastening apparatus
32 Fastening elements
50 Vehicle seat
60 Seat part
62 Seat frame
64 Wire frame
66 Retaining plate
70 Cushion part
72 Foam part
74 Through opening
76 Through hole
78 Bolster
80 Upholstery part
82 Upholstery part opening
84 Edge region
86 Fastening bar
90 Backrest
100 Covering
120 Carrier
122 Opening
124 Centering means
126 Clip
140 Bezel
142 Edge
144 Opening
146 Centering means
148 Clip
160 Cover
162 Centering means
164 Clip
166 Grip opening
180 Assembly

What is claimed is:

1. A vehicle seat with a cushion part and at least one covering for lining a through opening in the cushion part, the covering having a carrier, a bezel and a cover, wherein the carrier is fastened to a seat frame of the vehicle seat, wherein an edge region of an upholstery part, which edge region surrounds an upholstery part opening, is clamped in between the bezel and the carrier,
wherein a fastening element for fastening a child seat is arranged or can be arranged in the through opening or behind the through opening.

2. The vehicle seat as claimed in claim 1, wherein the seat frame has a wire frame, and two retaining plates which are fastened to the wire frame.

3. The vehicle seat as claimed in claim 1, wherein the carrier has a frame-shaped design.

4. The vehicle seat as claimed in claim 1, wherein the carrier is manufactured from plastic.

5. The vehicle seat as claimed in claim 1, wherein the carrier has at least one clip for fastening the carrier to the seat frame.

6. The vehicle seat as claimed in claim 1, wherein the bezel has a frame-shaped design.

7. The vehicle seat as claimed in claim 1, wherein the bezel has a peripheral edge.

8. The vehicle seat as claimed in claim 1, wherein the bezel is manufactured from plastic.

9. The vehicle seat as claimed in claim 1, wherein the bezel has at least one clip for fastening the bezel to the carrier.

10. The vehicle seat as claimed in claim 1, wherein the cover has at least one clip for fastening the cover to the bezel.

11. The vehicle seat as claimed in claim 1, wherein the cover can be detached from the bezel, and/or the cover is mounted pivotably on the bezel.

12. A method for mounting a covering on a seat part of a vehicle seat, comprising:
- a) mounting of a bezel and a cover to form a preassembled assembly,
- b) mounting of a carrier on a seat frame of the vehicle seat,
- c) placing of a cushion part onto the seat frame,
- d) plugging of the assembly through a through opening of the cushion part, into the carrier, as a result of which an edge region of an upholstery part of the cushion part is clamped in between the bezel and the carrier, and
- e) fastening of the assembly to the carrier,
wherein an edge region of the upholstery part, which edge region surrounds an upholstery part opening, is clamped in between the bezel and the carrier,
wherein a fastening element for fastening a child seat is arranged or can be arranged in the through opening or behind the through opening.

13. The method as claimed in claim 12, wherein the mounting of the bezel and the cover to form a preassembled assembly takes place temporally before the mounting of the carrier on the seat frame of the vehicle seat.

14. The method as claimed in claim 12, wherein the mounting of the carrier on the seat frame of the vehicle seat takes place temporally before the mounting of the bezel and the cover to form a preassembled assembly.

\* \* \* \* \*